(12) United States Patent
Kneller et al.

(10) Patent No.: US 7,936,285 B2
(45) Date of Patent: May 3, 2011

(54) MULTIPURPOSE INFORMATION TRANSFER MEDIUM EYEPIECE

(75) Inventors: Heidi Joy Kneller, Bellevue, WA (US); Calsee Nicole Robb, Seattle, WA (US); William Anthony Harkness, Everett, WA (US); Buddy L. Sharpe, Mill Creek, WA (US); James P. Schalla, Edmonds, WA (US)

(73) Assignee: The Boeing Company, Chicago, IL (US)

( * ) Notice: Subject to any disclaimer, the term of this patent is extended or adjusted under 35 U.S.C. 154(b) by 413 days.

(21) Appl. No.: 12/141,333

(22) Filed: Jun. 18, 2008

(65) Prior Publication Data

US 2009/0319902 A1    Dec. 24, 2009

(51) Int. Cl.
G08B 21/00 (2006.01)

(52) U.S. Cl. ........ 340/945; 340/963; 340/973; 340/980; 340/982; 340/995.16; 340/995.27; 340/540; 340/541; 348/53; 348/135; 348/E13.002; 351/156; 351/158; 351/159; 351/168

(58) Field of Classification Search .................. 340/945, 340/963, 973, 980, 982, 995.16, 995.27, 340/540, 541; 348/53, 135, E13.002; 351/156, 351/158, 159, 168

See application file for complete search history.

(56) References Cited

U.S. PATENT DOCUMENTS

| 6,769,767 | B2 * | 8/2004 | Swab et al. | 351/158 |
| 2005/0159182 | A1 * | 7/2005 | Lai | 455/556.1 |
| 2008/0239236 | A1 * | 10/2008 | Blum et al. | 351/159 |

OTHER PUBLICATIONS

U.S. Appl. No. 11/927,490, filed Oct. 29, 2007, Kneller.
U.S. Appl. No. 11/927,540, filed Oct. 29, 2007, Kneller.
U.S. Appl. No. 11/927,517, filed Oct. 29, 2007, Schalla.
U.S. Appl. No. 11/934,198, filed Nov. 2, 2007, Wanthal.
U.S. Appl. No. 11/927,368, filed Oct. 29, 2007, Schalla.
U.S. Appl. No. 60/951,434, filed Jul. 23, 2007, Robb.

* cited by examiner

*Primary Examiner* — Tai T Nguyen
(74) *Attorney, Agent, or Firm* — Yee & Associates, P.C.; Gail Bohnhoff-Hlavacek (57) ABSTRACT

An aircraft communications system is located on an aircraft. The aircraft communications system comprises a set of eyewear units, an aircraft data processing system, and a wireless system. Each eyewear unit has a set of sensors and a display. The set of eyewear units is capable of receiving user input and is capable of presenting information to a set of users of the set of eyewear units. The aircraft data processing system is capable of receiving the user input and sending the information to the set of eyewear units in response to receiving the user input from the set of eyewear units. The wireless system is located proximate to the cabin of the aircraft and is capable of sending the user input from the set of eyewear units to the aircraft data processing system and sending the information to the set of eyewear units.

19 Claims, 8 Drawing Sheets

MULTIPURPOSE INFORMATION TRANSFER MEDIUM EYEPIECE

BACKGROUND INFORMATION

1. Field

The present disclosure relates generally to an improved data processing system and particularly to a method and apparatus for transferring information. Still more particularly, the present disclosure relates to a computer implemented method, apparatus, and computer usable program code for transferring information in an aircraft.

2. Background

Air travel is a common form of transportation. Passengers traveling in an aircraft may have a need to communicate with the flight attendants, other passengers, and the airplane itself. Further, the flight attendants and other flight crew may need to communicate or give information to the passengers in the cabin of the aircraft. This information may include, for example, without limitation, safety information, weather updates, gate information, lavatory availability, and other suitable information.

Currently, the transfer of information between passengers and the flight crew involves the use of place cards, signs, and other visual aids located within the passenger cabin. These visual aids may not be universally clear and can be visually distracting. Further, the format of information may detract from the experience, aesthetics, and brand that an airline or airplane manufacturer wishes to create within the interior of the aircraft.

Information also may be communicated verbally between passengers and flight attendants. As an example, if a passenger desires to make a request, the passenger typically presses a button in the overhead section of the aircraft to signal that the passenger wishes to talk with a flight attendant. The activation of this button generates a signal or indicator in the flight attendant area indicating that a particular passenger wishes to speak with a flight attendant. This type of communication, however, does not provide any indication as to what the passenger wishes. The flight attendant travels to the seat where the passenger is sitting and talks to the passenger at the passenger's location. The flight attendant may then fulfill the request.

Thus, the transfer of information within a passenger cabin between flight attendants, other flight crew, and passengers is limited. Further, these types of systems also make communications between flight attendants and other flight crew more difficult. An additional issue is that the current communication methods for transferring information may be ineffective for many disabled passengers. As a result, existing solutions use place cards and signs with the flight attendants verbally providing information as needed.

Therefore, it would be advantageous to have a method and apparatus that overcomes the problems described above.

SUMMARY

In one advantageous embodiment, an aircraft communications system is located on an aircraft. The aircraft communications system comprises a set of eyewear units, an aircraft data processing system, and a wireless system. Each eyewear unit has a set of sensors and a display. The set of eyewear units is capable of receiving user input and is capable of presenting information to a set of users of the set of eyewear units. The aircraft data processing system is capable of receiving the user input and sending the information to the set of eyewear units in response to receiving the user input from the set of eyewear units. The wireless system is located in a cabin of the aircraft and is capable of sending the user input from the set of eyewear units to the aircraft data processing system and sending the information to the set of eyewear units.

In another advantageous embodiment, an apparatus comprises an eyewear unit and a set of modules. The eyewear unit has a set of sensors, a video display, and an audio device, a wireless communications unit, and a processing unit. The set of modules executes on the processing unit, wherein the eyewear unit is capable of receiving user input from the set of sensors and capable of presenting information to a user of the eyewear unit using at least one of the video display and the audio device.

In yet another advantageous embodiment, a computer implemented method is present for providing information to a user. A request is received from an eyewear unit comprising a set of sensors, a video display, an audio device, a wireless communications unit, a processing unit, and a set of modules executing on the processing unit. The eyewear unit is capable of receiving user input from the set of sensors and capable of presenting the information to a user of the eyewear unit using at least one of the video display and the audio device. Particular information responsive to the request is identified to form identified information. The identified information is sent to the eyewear unit.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
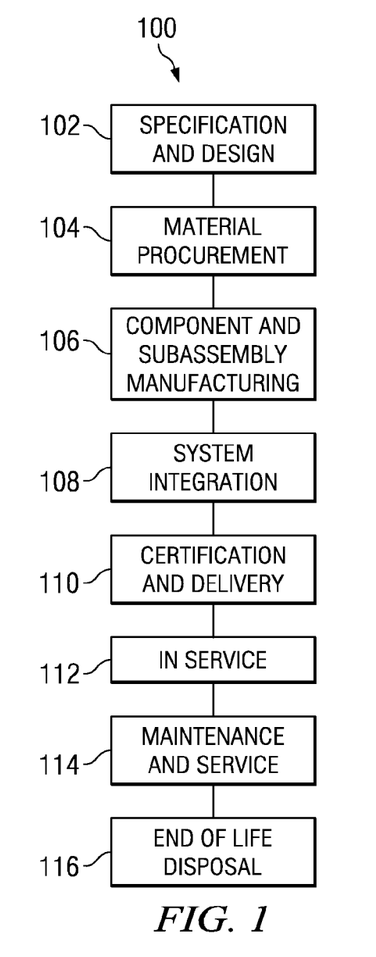
FIG. 1 is a diagram illustrating an aircraft manufacturing and service method in which an advantageous embodiment may be implemented.
Figure 2:
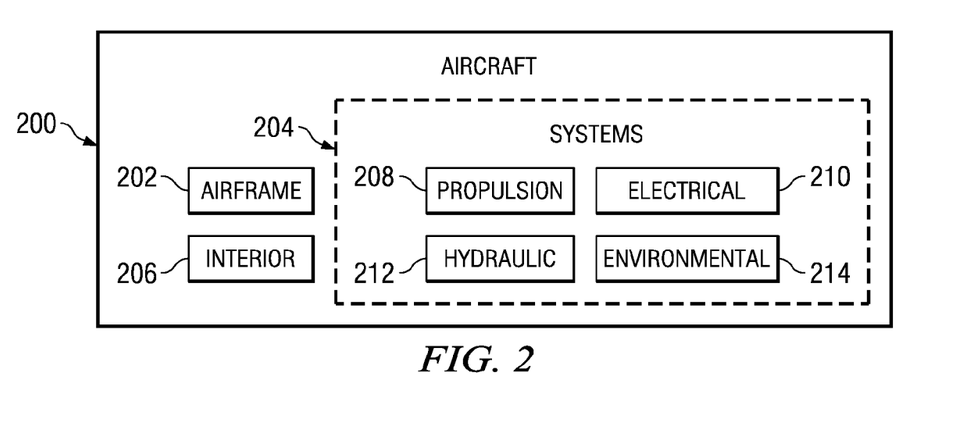
FIG. 2 is a diagram of an aircraft in accordance with an advantageous embodiment.

Referring more particularly to the drawings, embodiments of the disclosure may be described in the context of the aircraft manufacturing and service method 100 as shown in FIG. 1 and aircraft 200 as shown in FIG. 2. Turning first to FIG. 1, a diagram illustrating an aircraft manufacturing and service method is depicted in accordance with an advantageous embodiment. During pre-production, or retrofit exemplary aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service. When aircraft 200 is no longer usable or required for use, end of life disposal 116 may occur.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during any one or more of the stages of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 is in service 112 in FIG. 1.

Also, one or more apparatus embodiments, method embodiments, or a combination thereof may be utilized during production stages, such as component and subassembly manufacturing 106 and system integration 108 in FIG. 1, for example, without limitation, by substantially expediting the assembly of or reducing the cost of aircraft 200. Similarly, one or more of apparatus embodiments, method embodiments, or a combination thereof may be utilized while aircraft 200 is in service 112 or during maintenance and service 114 in FIG. 1.

As a specific example, an aircraft communication system may be manufactured during component and subassembly manufacturing 106 in FIG. 1 in accordance with an advantageous embodiment. The aircraft communication system may be implemented into aircraft 200 in FIG. 2 during system integration 108 in FIG. 1. Further, after aircraft 200 in FIG. 2 is in service, aircraft 200 in FIG. 2 may be modified or reconfigured during maintenance and service 114 in FIG. 1 to include an aircraft communication system, according to the different advantageous embodiments, if one was not included during the original manufacturing of aircraft 200 in FIG. 2.

The different advantageous embodiments provide a framework or architecture for transferring information within a passenger cabin. This information may be transferred in real time. The different advantageous embodiments may provide each passenger with an eyepiece that serve as an interface to transfer information.

The different advantageous embodiments combine language translators, virtual reality simulations, artificial intelligence software, sensor networks, augmented realities, and other suitable features to transfer information. With this type of system, passengers may receive information, as well as send requests or provide information to the flight attendants and other crew members.

Figure 3:
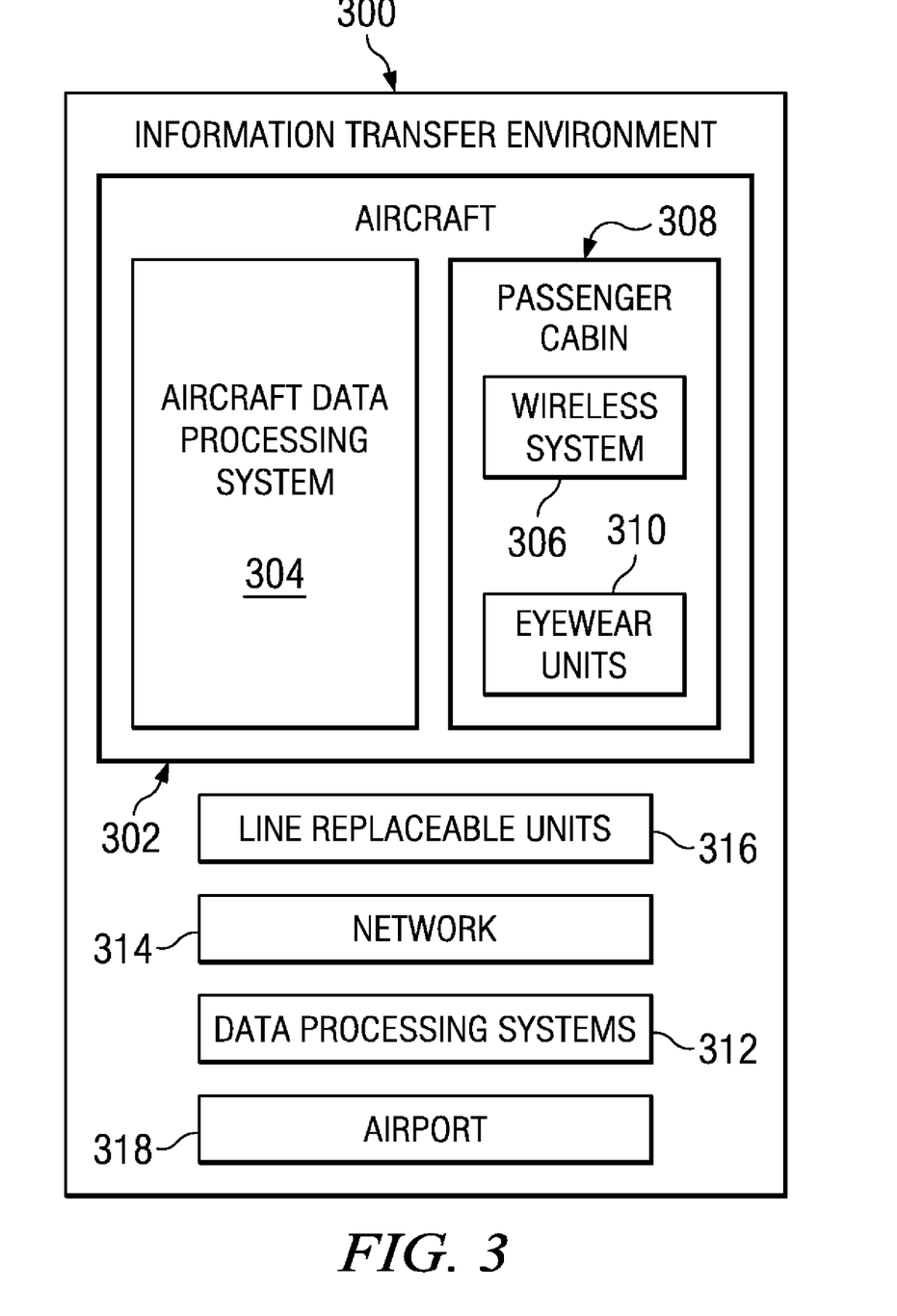
FIG. 3 is a block diagram of an information transfer environment in accordance with an advantageous embodiment.

With reference now to FIG. 3, a block diagram of an information transfer environment is depicted in accordance with an advantageous embodiment. In this example, information transfer environment 300 may include aircraft 302. Aircraft 302 has aircraft data processing system 304 which is in communication with wireless system 306 within passenger cabin 308. Wireless system 306 is an example of one type of wireless system that may be used to provide communication. Passengers and crew may use eyewear units 310 within passenger cabin 308 to transfer information. In these examples, information may be transferred between aircraft data processing system 304 and eyewear units 310 with wireless system 306 providing a wireless network to transfer information between these devices. Wireless system 306 may be, for example, a set of routers.

Further, additional information may be transferred between eyewear units 310 and other data processing systems, such as data processing systems 312, which may be located in other locations other than aircraft 302. Data processing systems 312 may communicate with aircraft data processing system 304 through network 314 to transfer information with eyewear units 310. Network 314 may include wireless and wired communications links.

When in flight, aircraft data processing system 304 may communicate with data processing systems 312 through wireless communications links. These communications links may be, for example, a satellite link, radio frequency transmission, or some other suitable mechanism. On the ground, other wireless transmission media may be used, as well as wired links connected to aircraft 302.

Eyewear units 310 may provide visual, audio, and/or tactile information to users through display and audio devices. Further, eyewear units 310 may include sensors to receive user input. This user input may be, for example, without limitation, gestures, eye movements, eye twitches, voice commands, and other suitable input.

In addition, aircraft 302 may also include line replaceable units 316. These line replaceable units include, for example, without limitation, an in-flight attendance system, an aircraft environmental system, or some other suitable type of line replaceable unit. Some of line replaceable units 316 may be controlled by aircraft data processing system 304 in response to user input received through eyewear units 310.

For example, functions, such as a movie or music presented to a passenger, using line replaceable units 316, may be controlled by aircraft data processing system 304 through requests received from passengers using eyewear units 310. As another example, the air conditioning for a particular seat or area may be controlled based on requests from passengers using eyewear units 310.

Although the different advantageous embodiments are described with respect to providing communications within aircraft 302, the different advantageous embodiments are not meant to limit the manner in which information transfer environment 300 may be implemented. Information transfer environment 300 also may be used to provide communications with users having eyewear units 310 in other locations. For example, the different advantageous embodiments may also be applied to users with eyewear units 310 located within airport 318. In this manner, users may exchange information with airlines, airport vendors, and other suitable entities.

Figure 4:
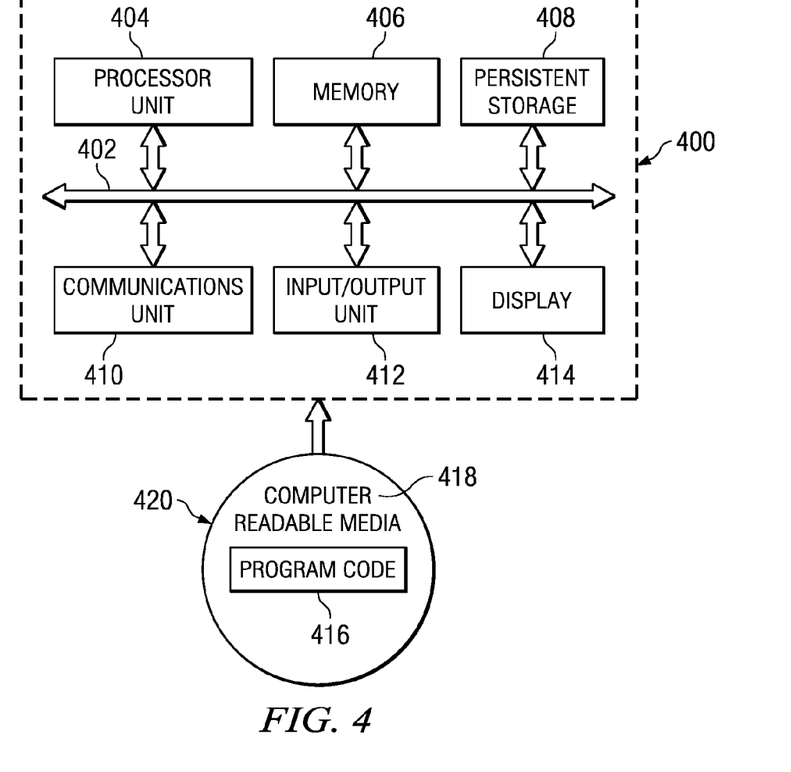
FIG. 4 is a diagram of a data processing system in accordance with an advantageous embodiment.

Turning now to FIG. 4, a diagram of a data processing system is depicted in accordance with an illustrative embodiment. Data processing system 400 may be used to implement various components such as, for example, without limitation, aircraft data processing system 304, data processing systems 312, and eyewear units 310 in FIG. 3. Depending on a particular implementation, fewer or additional components may be used in addition to those illustrated for data processing system 400.

In this illustrative example, data processing system 400 includes communications fabric 402, which provides communications between processor unit 404, memory 406, persistent storage 408, communications unit 410, input/output (I/O) unit 412, and display 414.

Processor unit 404 serves to execute instructions for software that may be loaded into memory 406. Processor unit 404 may be a set of one or more processors or may be a multi-processor core, depending on the particular implementation. Further, processor unit 404 may be implemented using one or more heterogeneous processor systems in which a main processor is present with secondary processors on a single chip. As another illustrative example, processor unit 404 may be a symmetric multi-processor system containing multiple processors of the same type.

Memory 406 and persistent storage 408 are examples of storage devices. A storage device is any piece of hardware that is capable of storing information either on a temporary basis and/or a permanent basis. Memory 406, in these examples, may be, for example, a random access memory or any other suitable volatile or non-volatile storage device. Persistent storage 408 may take various forms depending on the particular implementation. For example, persistent storage 408 may contain one or more components or devices. For example, persistent storage 408 may be a hard drive, a flash memory, a rewritable optical disk, a rewritable magnetic tape, or some combination of the above. The media used by persistent storage 408 also may be removable. For example, a removable hard drive may be used for persistent storage 408.

Communications unit 410, in these examples, provides for communications with other data processing systems or devices. In these examples, communications unit 410 is a network interface card. Communications unit 410 may provide communications through the use of either or both physical and wireless communications links.

Input/output unit 412 allows for input and output of data with other devices that may be connected to data processing system 400. For example, input/output unit 412 may provide a connection for user input through a keyboard and mouse. Further, input/output unit 412 may send output to a printer. Display 414 provides a mechanism to display information to a user.

Instructions for the operating system and applications or programs are located on persistent storage 408. These instructions may be loaded into memory 406 for execution by processor unit 404. The processes of the different embodiments may be performed by processor unit 404 using computer implemented instructions, which may be located in a memory, such as memory 406. These instructions are referred to as program code, computer usable program code, or computer readable program code that may be read and executed by a processor in processor unit 404. The program code in the different embodiments may be embodied on different physical or tangible computer readable media, such as memory 406 or persistent storage 408.

Program code 416 is located in a functional form on computer readable media 418 that is selectively removable and may be loaded onto or transferred to data processing system 400 for execution by processor unit 404. Program code 416 and computer readable media 418 form computer program product 420 in these examples.

In one example, computer readable media 418 may be in a tangible form, such as, for example, an optical or magnetic disc that is inserted or placed into a drive or other device that is part of persistent storage 408 for transfer onto a storage device, such as a hard drive that is part of persistent storage 408.

In a tangible form, computer readable media 418 also may take the form of a persistent storage, such as a hard drive, a thumb drive, or a flash memory that is connected to data processing system 400. The tangible form of computer readable media 418 is also referred to as computer recordable storage media. In some instances, computer readable media 418 may not be removable.

Alternatively, program code 416 may be transferred to data processing system 400 from computer readable media 418 through a communications link to communications unit 410 and/or through a connection to input/output unit 412. The communications link and/or the connection may be physical or wireless in the illustrative examples. The computer readable media also may take the form of non-tangible media, such as communications links or wireless transmissions containing the program code.

The different components illustrated for data processing system 400 are not meant to provide architectural limitations to the manner in which different embodiments may be implemented. The different illustrative embodiments may be implemented in a data processing system including components in addition to or in place of those illustrated for data processing system 400.

Other components shown in FIG. 4 can be varied from the illustrative examples shown. For example, if data processing system 400 is used to implement eyewear units 310 in FIG. 3, data processing system 400 may include storage devices in the form of flash memory rather than disk drives or other larger types of devices. Of course, the displays and other components may be used in data processing system 400 when implemented for use as eyewear units 310 in FIG. 3.

As one example, a storage device in data processing system 400 is any hardware apparatus that may store data. Memory 406, persistent storage 408, and computer readable media 418 are examples of storage devices in a tangible form.

Figure 5:
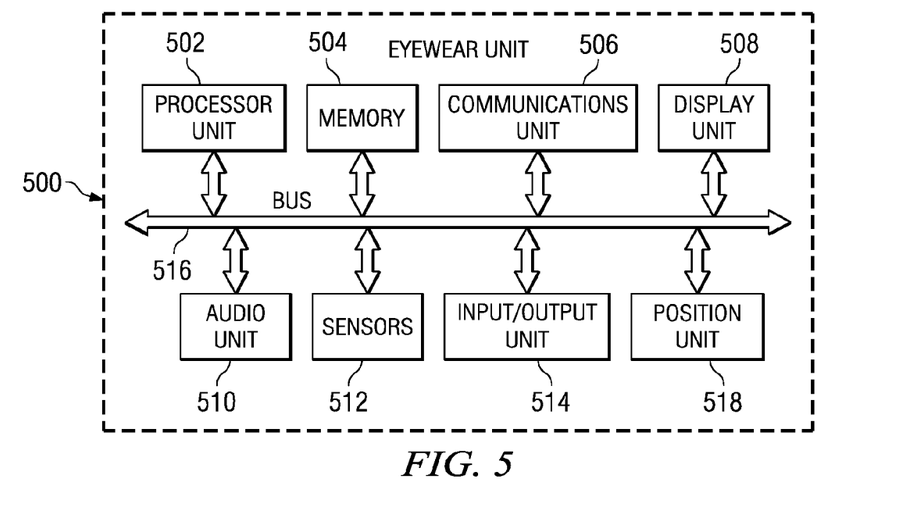
FIG. 5 is a diagram illustrating eyewear units in accordance with an advantageous embodiment.

With reference now to FIG. 5, a diagram illustrating eyewear units is depicted in accordance with an advantageous embodiment. In this example, eyewear unit 500 is an example of an eyewear unit within eyewear units 310 in FIG. 3. As illustrated, eyewear unit 500 includes processor unit 502, memory 504, communications unit 506, display unit 508, audio unit 510, sensors 512, and input/output unit 514.

These different components are connected through bus 516 in this illustrative example. Processor unit 502 may be a set of processors. Processor unit 502 executes program code to provide functionality for eyewear unit 500. Memory 504 may be, for example, a flash memory, a random access memory, and/or some other suitable memory device. Memory 504 may store information, as well as program code executed by processor unit 502.

Communications unit 506 provides for communications with other data processing systems or devices. In particular, communications unit 506, in these examples, provides communications through wireless communications links. In these examples, communications unit 506 may be, for example, a Bluetooth unit, a Wi-Fi unit, or some other suitable wireless communications device.

Display unit 508 provides a display to a user of eyewear unit 500. This display may be, for example, a heads-up display, a light emitting diode display, or some other type of display. With a heads-up display, display unit 508 may provide augmented reality presentations to a user.

Audio unit 510 provides sounds to a user. Sensors 512 may be used to detect user input by a user. For example, sensors 512 may include a video camera, an infrared sensitive camera, a muscle twitch detector, an eye movement sensor, or some other sensor. These sensors may be used to identify various gestures, eye movements, muscle twitches, or other user stimuli to identify commands and information generated by user.

Input/output unit 514 may provide a capability to send and receive data. For example, input/output unit 514 may provide a connection to a keyboard and/or mouse that may be connected to eyewear unit 500. This type of connection may provide additional mediums for a user to interact with eyewear unit 500.

Positioning unit 518 provides positioning information for eyewear unit 500. Positioning unit 518 may be, for example, a global positioning system or receiver. In this manner, processors within eyewear unit 500 may perform localization to identify the location of eyewear unit 500 in performing various functions.

The presentation of eyewear unit 500 in FIG. 5 is presented for purposes of illustrating one manner in which eyewear units may be implemented. These different components are not meant to imply physical limitations or architectural limitations to the manner in which eyewear units may be implemented in other advantageous embodiments.

For example, other advantageous embodiments may include other components in addition to or in place of the components illustrated in FIG. 5. As another example, in other advantageous embodiments, other types of communication units other than a wireless communication unit may be used. For example, communications unit 506 may include a network interface card for wired connections in addition to or in place of a wireless device.

The program code providing functionality for eyewear unit 500 may be transmitted to eyewear unit 500 through communications unit 506 and stored into memory 504. Further, during the use of eyewear unit 500, new program code may be transmitted to memory 504 to provide new functionality or to remove functionality from eyewear unit 500.

Figure 6:
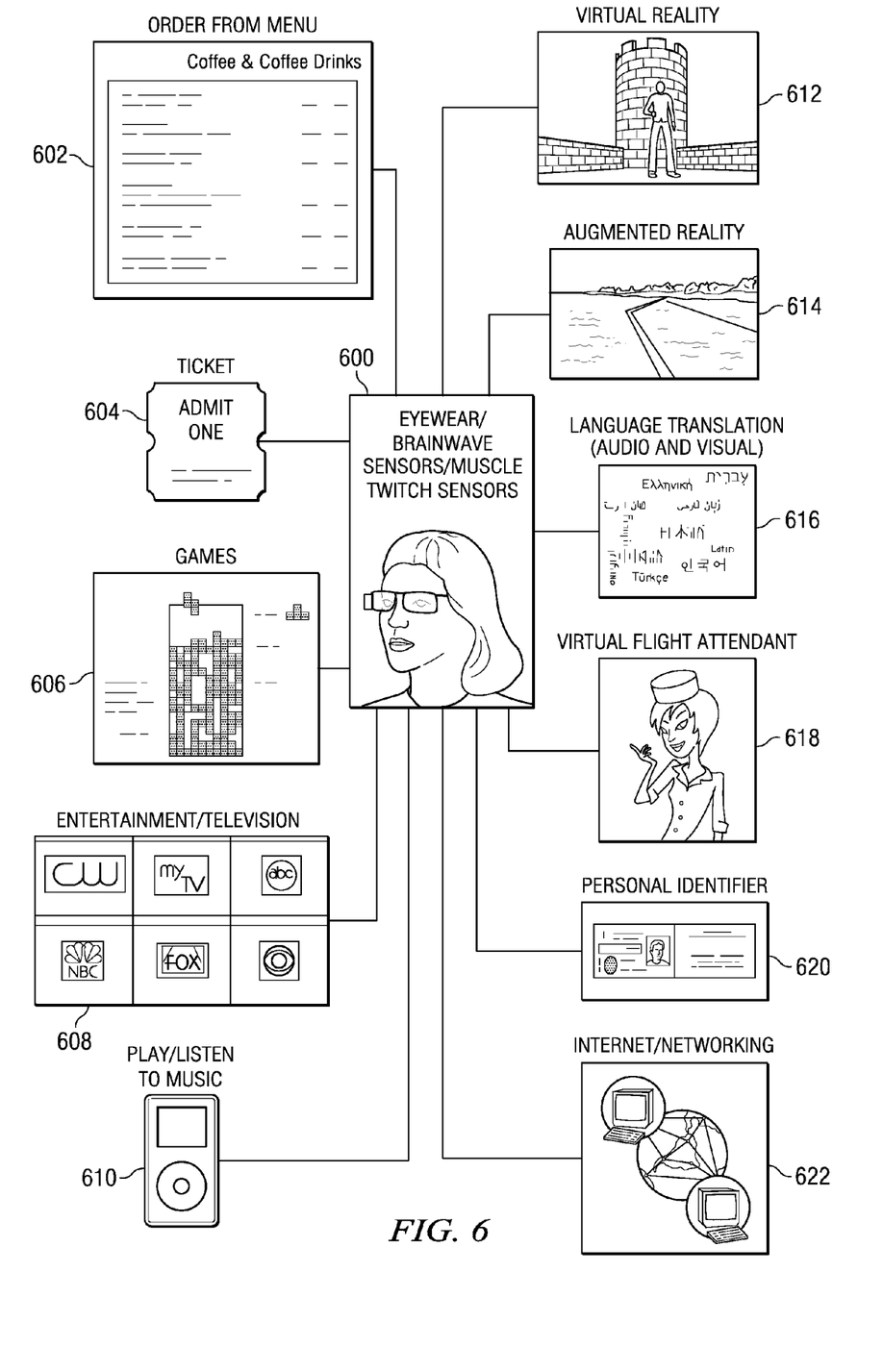
FIG. 6 is a diagram illustrating examples of information transfers in accordance with an advantageous embodiment.

With reference now to FIG. 6, a diagram illustrating examples of information transfers is depicted in accordance with an advantageous embodiment. In this example, eyewear unit 600 may provide access to information and provide functionality to transfer information. Eyewear unit 600, in these examples, may be implemented using eyewear unit 500 in FIG. 5. The transfer of information may include information being sent to the user of eyewear unit 600

Eyewear unit 600 may display information and receive user input. For example, eyewear unit 600 may display menu 602 and allow the user to order items from menu 602. Also, ticket information 604 may be provided through eyewear unit 600. Also, a passenger may be provided access to games 606 and entertainment and television 608. Music 610 also may be provided through eyewear unit 600.

Additional functions, such as virtual reality 612, augmented reality 614, language translation 616, and virtual flight attendant 618, may also be provided. Through eyewear unit 600, the user also may provide personal identification 620.

Augmented reality 614 may superimpose or display information over or in association with an object that a user sees. For example, augmented reality 614 may display emergency evacuation paths when a user looks down the aisle of a passenger cabin. As another example, with augmented reality 614, a user may view seat information such as, for example, row and seat identifier displayed on seats as a user moves down an aisle. In other example, a graphical indicator or avatar may be displayed over or in association with a seat assigned to a passenger as the passenger moves down an aisle looking for the passenger's seat.

Virtual flight attendant 618 may allow the user of eyewear unit 600 to send requests to the flight attendants. These requests may be ones that may be fulfilled by virtual flight attendant 618, in some examples. For example, if a user wishes to obtain connection gate information, the user may query virtual flight attendant 618. In other examples, the query made to virtual flight attendant 618 may be passed onto a non-virtual flight attendant who may fulfill the request.

Additionally, the user may access Internet 622 through eyewear unit 600. In this manner, the user may, for example, access e-mail or other information through Internet 622. These functionalities are only examples of some of the functionalities that may be provided through eyewear unit 600. Of course, in other advantageous embodiments, other types of information transfers may be provided in addition to or in place of the ones illustrated in FIG. 6. For example, eyewear unit 600 also may provide information such as, for example, without limitation, crew announcements, cockpit announcements, place card information, lavatory availability, food and beverage service, aircraft noises and functions, safety information, emergency information, and other suitable types of information.

The illustration of eyewear unit 600 in FIG. 6 is present for purposes of depicted one manner in which an eyewear unit can be implemented and is not meant to imply physical or architectural limitations on the manner in which different advantageous embodiments may be implemented. For example, eyewear unit 600 is illustrated as a pair or eyeglasses. In other advantageous embodiments, an eyewear unit may take the form of a helmet, a hat, or any other suitable form of head gear.

Figure 7:
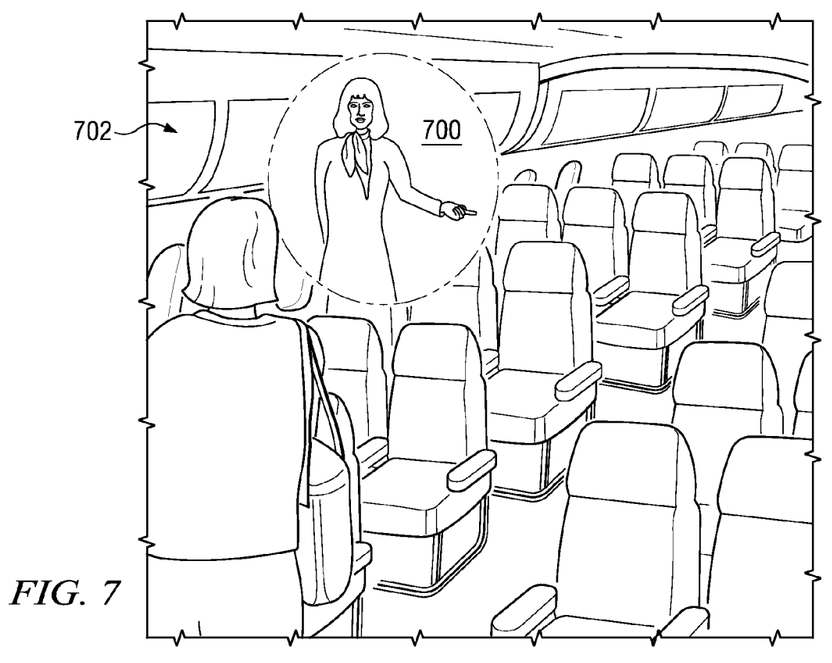
FIG. 7 is a diagram illustrating a presentation of information using eyewear units in accordance with an advantageous embodiment.

With reference now to FIG. 7, a diagram illustrating a presentation of information using eyewear units is depicted in accordance with an advantageous embodiment. In this example, avatar 700 is presented within passenger cabin 702. The user of the eyewear unit transmits information, such as what the user sees and the user's location in cabin 702. Avatar 700 may be displayed on the display of the eyewear unit in a manner that overlays what the passenger sees. Avatar 700 may be a virtual flight attendant guiding the passenger to the passenger's seat. The view of cabin 702 is from the perspective of a passenger wearing an eyewear unit.

Figure 8:
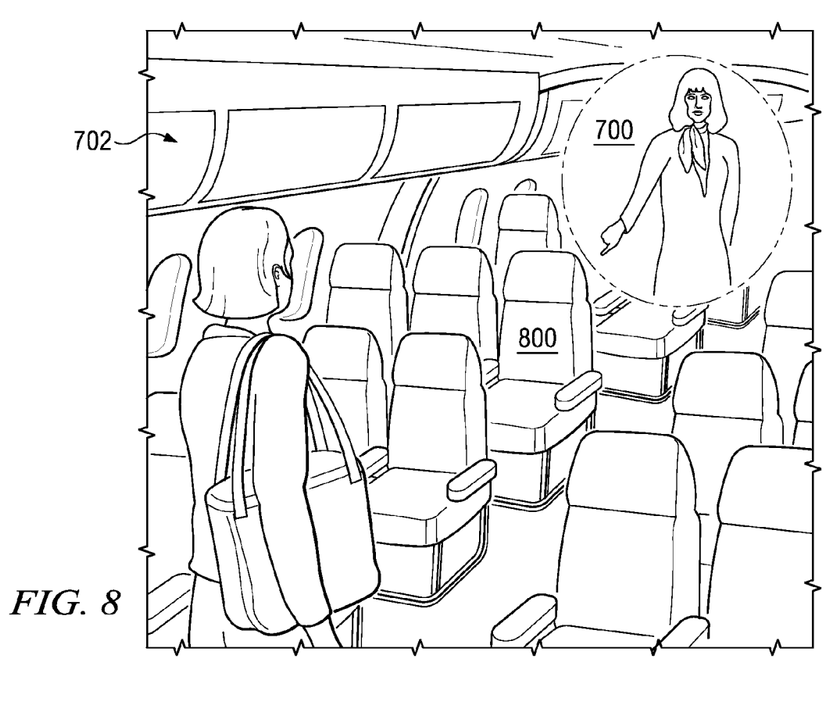
FIG. 8 is a diagram illustrating an identification of a passenger seat in accordance with an advantageous embodiment.

In FIG. 8, a diagram illustrating an identification of a passenger seat is depicted in accordance with an advantageous embodiment. In this example, avatar 700 points to seat 800 within cabin 702 to identify the passenger's seat for the flight. In this manner, it is unnecessary for a passenger to look for the passenger's seat by reading row numbers and seat identifiers. The illustration of information presentation in FIGS. 8 and 9 are presented for purposes of depicting an example of information transfer and not meant as limitations to the type of information and the manner in which information may be transferred using eyewear units.

Figure 9:
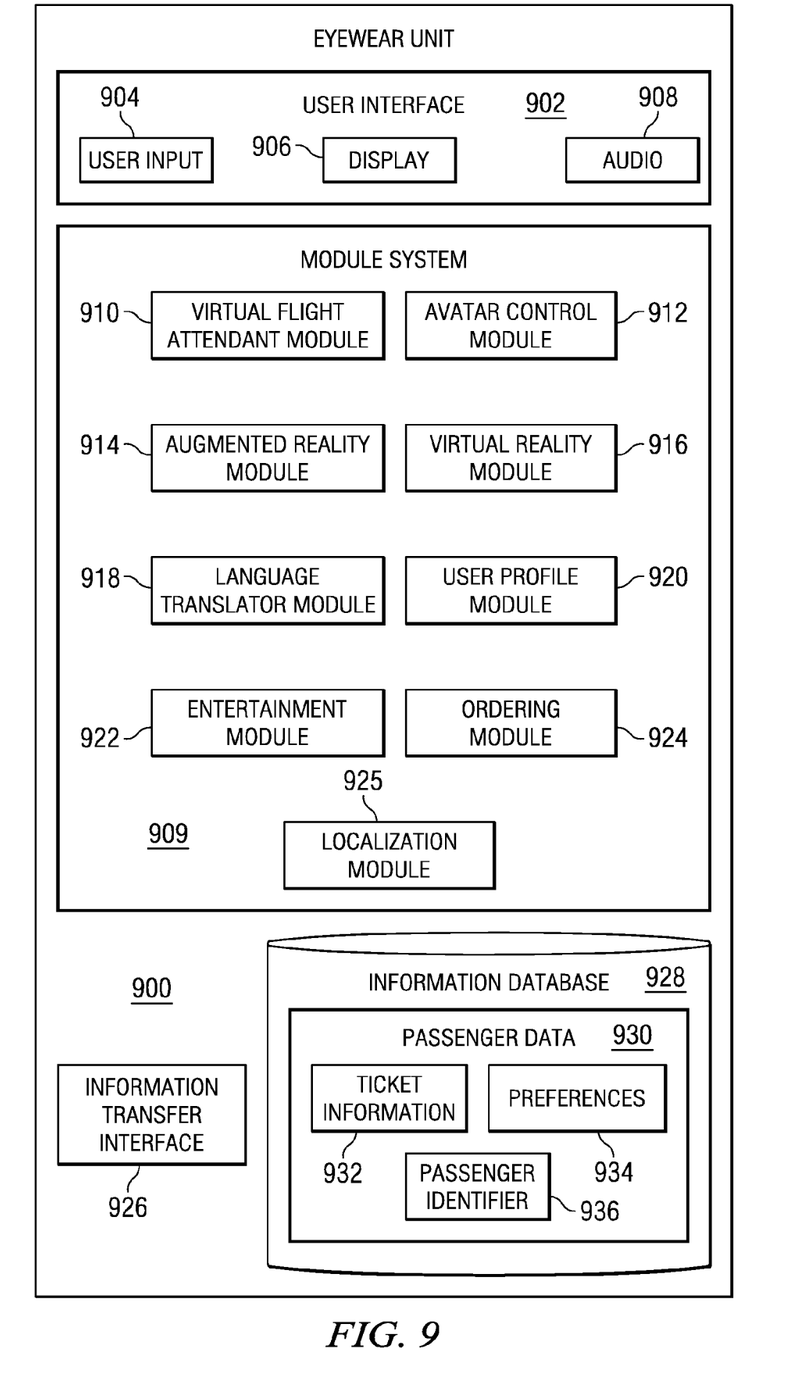
FIG. 9 is a functional block diagram of eyewear units in accordance with an advantageous embodiment.

With reference now to FIG. 9, a functional block diagram of eyewear units is depicted in accordance with an advantageous embodiment. In this example, eyewear unit 900 is an example of one implementation for eyewear units within eyewear units 310 in FIG. 3. Eyewear unit 900 is an illustration of functional components that may be implemented using software and/or firmware in a data processing system, such as, for example, data processing system 400 in FIG. 4.

Eyewear unit 900 includes user interface 902, which has user input 904, display 906, and audio 908. Eyewear unit 900 also includes module system 909. Module system 909 comprises a set of modules that may be used to process information in eyewear unit 900. As used herein, a set of items refers to one or more items. For example, a set of modules is one more modules.

Additionally, module system 909 includes virtual flight attendant module 910, avatar control module 912, augmented reality module 914, virtual reality module 916, language translator module 918, user profile module 920, entertainment module 922, ordering module 924, localization module 925, and interior architecture module 926. Eyewear unit 900 also includes information transfer interface 927 and information database 928.

User interface 902 provides software components used by a user to interact with eyewear unit 900. For example, display 906 is a software component that may control the display of images to a user on eyewear unit 900. Audio 908 may control the presentation of sounds presented to a user of eyewear unit 900.

User input 904 provides the user a capability to make requests and send information to users and data processing systems. User input 904 may include processes to receive user input from various devices such as, for example, a microphone, a video camera, a motion detector, and other suitable devices. As another example, user input 904 may receive user input from a keyboard, mouse, pointing device, or any other suitable user input device attached to eyewear unit 900.

In addition, localization module 925 may perform localization processes to identify the location of eyewear unit 900. This position also may include the orientation or direction a user is facing. Localization module 925 may receive data signals from a component such as, for example, a global positioning system. Additionally, other types of data may be used to identify the location of eyewear unit 900. Localization module 925 may provide this information to other modules in performing their functions. For example, avatar control module 912 and augmented reality module 914 may present an avatar to a user to guide and identify locations for users, such as within the aircraft or within an airport, based on knowing the position of the user and share information about the airplane and airplane functionality.

User input 904 may receive user input through a number of different mechanisms. For example, user input 904 may receive user input in response to a user selection of functions presented using display 906. For example, display 906 may represent controls such as, for example, drop down menus, selectable icons, or other suitable controls.

Information database 928 may cache information for use by eyewear unit 900. For example, information database 928 may include passenger data 930. Passenger data 930 may include, for example, ticket information 932, preferences 934, and passenger identifier 936. Ticket information 932 may include information about the user's ticket. Ticket information 932 may be, for example, an electronic ticket.

Information database 928 may include other information in addition to or in place of passenger data 930. The information stored in information database 928 may be used by module system 909 to provide functionality for eyewear unit 900.

Preferences 934 may include various preferences about the passenger for use during the flight. For example, preferences 934 may include a seating preference, a food preference, and other information that may be used by an airline or other service to tailor various services to the passenger. Passenger identifier 936 may provide an identification of a passenger. This identification may be for purposes of authenticating use of different services and billing for services.

Module system 909 may perform various processes to generate information for presentation to a user through user interface 902. For example, various modules within module system 909 may control display 906 and audio 908 in response to user input sent to user input 904. In this illustrative example, virtual flight attendant module 910 may provide a capability to process requests made by a user.

For example, instead of pressing a button and waiting for a flight attendant to come and receive a request, the passenger may activate virtual flight attendant module 310 to make the request without waiting for an actual flight attendant. For example, a passenger may request a blanket, water, a magazine, gate information, or make some other request through virtual flight attendant module 910.

Virtual flight attendant module 910 may determine whether the request can be fulfilled by sending information to eyewear unit 900. For example, the user may wish to know the amount of time left before landing. Virtual flight attendant module 910 may obtain that information and present the information to the user. Virtual flight attendant module 910 may cause an avatar in the form of a flight attendant to be displayed to the user on display 906 as a virtual reality flight attendant. This type of presentation may be performed in conjunction with avatar control module 912 and augmented reality module 914. Further, the information may be presented to the user through audio 908.

If the request cannot be fulfilled directly through virtual flight attendant module 910, virtual flight attendant module 910 may relay the request to a non-virtual flight attendant. In this manner, the flight attendant already knows what the passenger is requesting without having to travel to the passenger's seat. The non-virtual flight attendant may relay an acknowledgement of the request through virtual flight attendant module 910 and perform the request. This request may be, for example, bringing a blanket to the passenger.

Avatar control module 912 controls an avatar presented to the user on display 906. Avatar control module 912 may include information and processes to present an avatar to a user. In these examples, the avatar may be a virtual flight attendant. Of course, other types of avatars may be used depending on the particular implementation. For example, avatar control module 912 may present an animated character, an animal, a robot, or some other object as an avatar.

Augmented reality module 914 may provide overlays to display 906 to the environment seen by a passenger. For example, when a passenger is moving in the passenger cabin looking for the passenger's seat, a virtual flight attendant may be displayed using augmented reality module 914 to point to the passenger's seat. Other information such as, for example, exit routes and the location of safety equipment may be identified using a virtual flight attendant or other graphical indicators during review of safety procedures.

These overlays may be presented in conjunction with other modules such as, for example, avatar control module 912 and virtual flight attendant module 910. Augmented reality module 914 may use information from localization module 925 to correctly position the avatar in the display to the user.

Virtual reality module 916 may provide virtual reality experiences for the passenger. Virtual reality module 916 may present various environments or scenes, as well as interactions for the user. Virtual reality module 916 may allow the user to interact with other users such as, for example, passengers in the passenger cabin or users elsewhere. In other words, virtual reality module 916 allows a user to interact with a computer simulated environment.

Virtual reality module 916 may control display 906 and audio 908 to present the simulated environment. User input 904 may be used to receive user input for the interaction with this environment.

Language translator module 918 may be a language translator downloaded to and included within module system 909 to provide language translations for a particular user of eyewear unit 900. For example, a user who only speaks French may have an instance of language translator module 918 that provides English-to-French translations if traveling on a flight in the United States. Of course, language translator module 918 may provide translations for any language, depending on the particular user.

User profile module 920 provides a capability to verify whether the user has access rights to eyewear unit 900. In other words, user profile module 920 may determine whether a particular person can use eyewear unit 900. Some eyewear units may be usable by any user, while other eyewear units may be tailored to a particular passenger. User profile module 920 may receive information to identify and authorize a user through user input 904. This information may include, for example, a picture of a fingerprint of the user, a retina scan, a user identification and password, or some other authorization or access information.

Entertainment module 922 may provide various types of in-flight entertainment for a user. Entertainment module 922 may provide, for example, without limitation, music, games, movies, Internet access, electronic books, and other entertainment features.

Ordering module 924 may be used to order various items. These items may be goods and/or services. For example, ordering module 924 may be used to order a meal during flight. Further, ordering module 924 may be used to obtain a rental car, a hotel, another flight, or some other item depending on the particular implementation.

Interior architecture module 926 may provide information about the interior of the aircraft. For example, interior architecture module 926 may provide information such as, for example, emergency exits, safety information, emergency information, location of lavatories, location of galleys, and other suitable information about the interior of the aircraft.

Information transfer interface 927 provides a capability to transfer information between various components within eyewear unit 900 and the aircraft data processing system and/or other data processing systems that may be in communication with eyewear unit 900 or the aircraft data processing system. For example, information transfer database 926 may include the processes and protocols needed for communicating with wireless routers within the passenger cabin.

Information transfer interface 927 also may provide a capability to access the Internet, as well as other networks depending on the particular implementation. Information transfer interface 927 may include protocols for various transmission technologies such as, for example, Wi-Fi, Bluetooth transmissions, or other suitable wireless transmission systems. Of course, information transfer interface 926 may provide processes to transfer information with other data processing systems on the Internet and other computer networks.

The illustration of components in eyewear unit 900 is presented for purposes of illustrating one manner in which an eyewear unit may be implemented. This illustration is not meant to imply architectural limitations to other embodiments. For example, in other embodiments, virtual flight attendant module 910 and avatar control module 912 may be implemented as a single component. Also, other embodiments may include other components in addition to or in place of the ones illustrated for eyewear unit 900.

Figure 10:
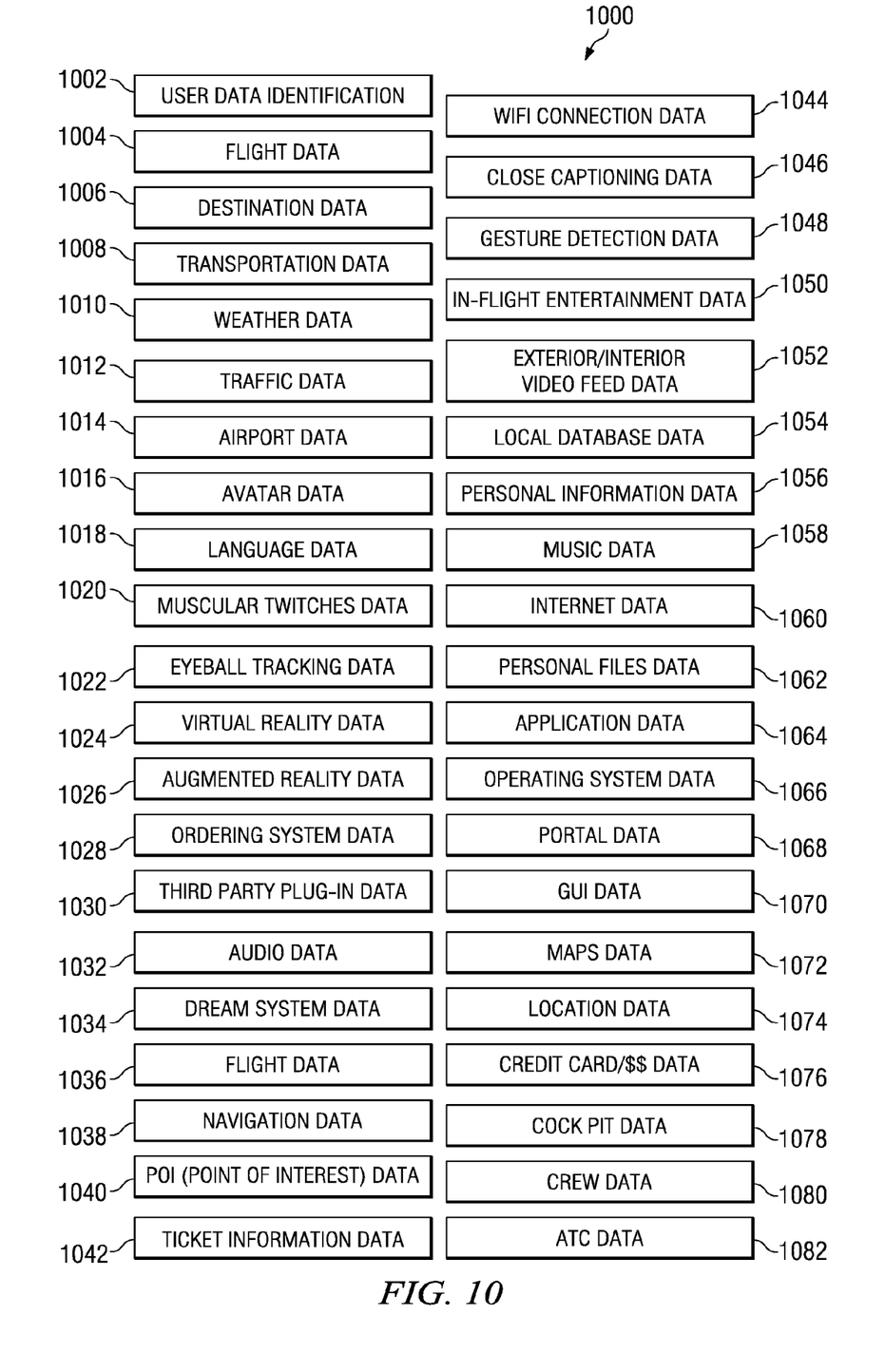
FIG. 10 is a diagram illustrating types of information that may be transferred to eyewear units in accordance with an advantageous embodiment.

With reference now to FIG. 10, a diagram illustrating types of information that may be transferred to eyewear units is depicted in accordance with an advantageous embodiment. In this example, information 1000 is an example of different types of information that may be sent to and/or transmitted by eyewear units such as, for example, eyewear unit 600 in FIG. 6.

In these examples, information 1000 includes user data identification 1002, flight data 1004, destination data 1006, transportation data 1008, weather data 1010, traffic data 1012, airport data 1014, avatar data 1016, language data 1018, muscular twitches data 1020, eyeball tracking data 1022, virtual reality data 1024, augmented reality data 1026, ordering system data 1028, third party plug-in data 1030, audio data 1032, dream system data 1034 flight data 1036, navigation data 1038, point of interest (POI) data 1040, ticket information data 1042, WiFi connection data 1044, close captioning data 1046, gesture detection data 1048, in-flight entertainment (IFE) data 1050, exterior/interior video feed data 1052, local database data 1054, personal information data 1056, music data 1058, Internet data 1060, personal files data 1062, application data 1064, operating system data 1066, portal data 1068, GUI data 1070, maps data 1072, location data 1074, credit card/$$ data 1076, cockpit data 1078, crew data 1080, and air traffic control (ATC) data 1082.

Information 1000 includes both data sent to the user of the eyewear units, as well as data that may be transmitted by the user of the eyewear units. For example, flight data 1004, destination data 1006, transportation data 1008, weather data 1010, traffic data 1012, and airport data 1014 are examples of data that may be transferred to eyewear units. Muscle twitches data 1020 and eyeball tracking data 1022 are examples of information that may be transmitted from eyewear units.

The data illustrated in FIG. 10 is provided for purposes of illustrating some of the types of information that may be transferred using eyewear units. Of course, other types of information may be used in addition to or in place of the data illustrated in FIG. 10.

Figure 11:
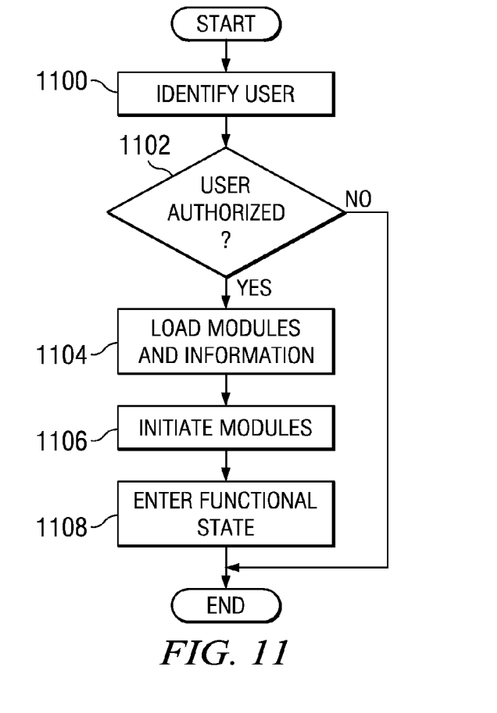
FIG. 11 is a flowchart of a process for initializing eyewear units in accordance with an advantageous embodiment.

With reference now to FIG. 11, a flowchart of a process for initializing eyewear units is depicted in accordance with an advantageous embodiment. The process illustrated in FIG. 11 may be implemented in a software component such as, for example, user profile module 920 in FIG. 9.

The process begins by identifying a user (operation 1100). The user may be identified in a number of different ways in operation 1100. For example, the user may enter a user identifier and/or pass code. In another example, the user may be identified based on a retina scan, a fingerprint, or some other manner of unique identification for identifying the user. The fingerprint of the user may be identified using a camera or a fingerprint scanner attached to the eyewear units.

After identifying the user, a determination is made as to whether the user is authorized to use the eyewear units (operation 1102). This determination may be made by accessing information within the eyewear units to determine whether the particular user is allowed to use the device. In some implementations, any user having a ticket for the particular flight may be allowed to use the eyewear units.

In other advantageous embodiments, the eyewear unit may be a device owned by the user for which only that user is authorized for use. If the user is authorized, the process loads modules and information (operation 1104). These modules and information may include, for example, software components, such as those found in module system 909 in FIG. 9. These modules may be found within the eyewear units or downloaded from an external source. The information may include information for a particular flight, information used by the modules, or other suitable information for the eyewear units.

The process initiates the modules (operation 1106). After the modules have been initiated, the eyewear units enter a functional state (operation 1108), with the process terminating thereafter. In the functional state, the eyewear units may perform various functions in response to user input and information received by the eyewear units from other sources.

With reference again to operation 1102, if the user is not authorized, the process terminates. As a result of this type of termination, no functionality is usable within the eyewear units.

Figure 12:
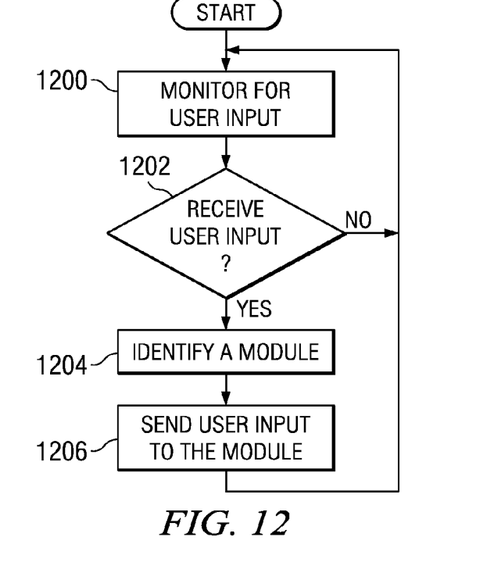
FIG. 12 is a flowchart of a process for handling user input in accordance with an advantageous embodiment.

With reference to FIG. 12, a flowchart of a process for handling user input is depicted in accordance with an advantageous embodiment. The process illustrated in FIG. 12 may be implemented in a software component such as, for example, user input 904 in FIG. 9.

The process begins by monitoring for user input (operation 1200). This operation may monitor for input from a user, such as a particular eye movement, hand movement, muscle twitch, or other suitable input. User input may be present only when certain actions are taken from a user in these examples. For example, a particular hand movement, eye movement, or muscle twitch may be considered user input when a function from a display menu or a particular type of input is detected.

The process determines whether user input has been received (operation 1202). If user input has not been received, the process returns to operation 1200. If user input has been received, the process identifies a module for the user input (operation 1204). This user input is information and may take the form of commands and/or data. The module may be identified based on the user input. For example, the user input may select a particular function associated with a module within the eyewear unit. The process then sends the user input to the module (operation 1206), with the process then returning to operation 1200 to monitor for more user input.

Figure 13:
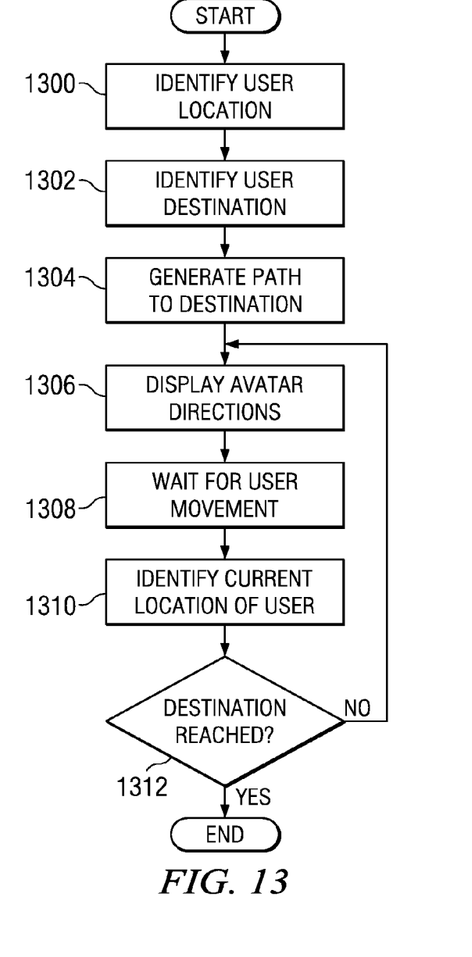
FIG. 13 is a flowchart of a process for an avatar in accordance with an advantageous embodiment.

With reference now to FIG. 13, a flowchart of a process for an avatar is depicted in accordance with an advantageous embodiment. The process illustrated in FIG. 13 may be implemented using a software component, such as avatar control module 912 in FIG. 9. Further, this process may use information and functions from other modules. For example, the process may include augmented reality module 914 and localization module 925 in FIG. 9.

As illustrated, the process identifies the user location (operation 1300). This operation may be performed using a localization module. The process identifies a user destination (operation 1302). This destination may be identified through the augmented reality module. The process generates a path to the destination (operation 1304).

The process displays an avatar directing the user to move along the path (operation 1306). The display of the avatar may be presented using the avatar control module and augmented reality module to present the avatar in a manner that directs the user to the destination. The process then waits for user movement (operation 1308). When the user moves, a current location of the user is identified (operation 1310).

The process then determines whether the destination has been reached (operation 1312). If the destination has been reached, the process terminates and the avatar is no longer presented. If the destination has not been reached in operation 1312, the process returns to operation 1306 to continue to display the avatar directing the user along the path towards the destination.

This process may be used in any situation in which a user of the eyewear units needs guidance. For example, this process may be used to guide the passenger to the passenger's seat. The process may also be used to guide a user to various locations within airports such as, for example, without limitation, a restaurant, a gate terminal, a newsstand, or some other suitable destination.

In this manner, the different advantageous embodiments provide an aircraft communications system in which eyewear units, a data processing system, and routers may transfer information. The different advantageous embodiments may use a combination of multimedia presentations of information to provide information to a user.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

Although the different advantageous embodiments are described with respect to the use of eyewear units, some advantageous embodiments may implement the hardware and/or software into headrests with display on the back of the headrest for passengers.

As used herein, the phrase "at least one of", when used with a list of items, means that different combinations one or more of the items may be used and only one of each item in the list may be needed. For example, "at least one of item A, item B, and item C" may include, for example, without limitation, item A, or item A and item B. This example also may include item A, item B, and item C, or item B and item C.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD.

Further, a computer-usable or computer-readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An aircraft communications system located on an aircraft, the aircraft communications system comprising:
    a set of eyewear units in which each eyewear unit has a set of sensors and a display, wherein the set of eyewear units is configured to receive user input from the set of sensors and configured to present information to a set of users of the set of eyewear units using the display;
    an aircraft data processing system configured to receive the user input and send the information to the set of eyewear units in response to receiving the user input from the set of eyewear units; and
    a wireless system located in a cabin of the aircraft, wherein the wireless system is configured to send the user input from the set of eyewear units to the aircraft data processing system and send the information to the set of eyewear units.

2. The aircraft communications system of claim 1 further comprising:
    a set of line replaceable units located on the aircraft, wherein the aircraft data processing system is configured to control functions for the set of line replaceable units in response to the user input.

3. The aircraft communications system of claim 2, wherein the set of line replaceable units comprises at least one of an in-flight entertainment system, an aircraft environmental control system.

4. The aircraft communications system of claim 1, wherein an eyewear unit in the set of eyewear units is configured to convey the information using a virtual reality module.

5. The aircraft communications system of claim 1, wherein the eyewear unit in the set of eyewear units is configured to display an avatar to present the information to a passenger using the eyewear unit.

6. The aircraft communications system of claim 5, wherein the avatar is displayed in an augmented reality.

7. The aircraft communications system of claim 1, wherein the set of eyewear units is configured to provide at least one of ticket information, internet access, ordering, language translation, virtual reality, games, music, video, and a virtual flight attendant, entertainment, safety information, crew information, cockpit information, and interior architecture information.

8. The aircraft communications system of claim 1, wherein each of the set of eyewear units executes a set of software modules.

9. The aircraft communications system of claim 8, wherein the aircraft data processing system sends a software module within the set of software modules to the set of eyewear units.

10. The aircraft communications system of claim 1, wherein the set of eyewear units comprises at least one of an augmented realty module, a virtual flight attendant module, a virtual reality module, a language translator module, a user profile module, an entertainment module, a localization module, and an ordering module.

11. An apparatus comprising:
    an eyewear unit having a set of sensors, a video display, an audio device, a wireless communications unit, and a processing unit; and
    a set of modules executing on the processing unit, wherein the eyewear unit is configured to receiving user input from the set of sensors and configured to present information to a user of the eyewear unit using at least one of the video display and the audio device a wireless system located in an aircraft; and
    an aircraft data processing system configured to communicate with the eyewear unit using the wireless system, wherein the aircraft data processing system sends the information to the eyewear unit in response to the user input received from the eyewear unit.

12. The apparatus of claim 11 further comprising:
a set of replaceable line units in the aircraft, wherein the aircraft data processing system is configured to control functions for the set of line replaceable units in response to the user input.

13. The apparatus of claim 12, wherein the set of line replaceable units comprises at least one of an in-flight entertainment system, an aircraft environmental control system.

14. The apparatus of claim 11 further comprising:
a second wireless system located in an airport; and
a data processing system configured to communicate with the eyewear unit using the set of wireless routers, wherein the data processing system sends the information to the eyewear unit in response to the user input received from the eyewear unit.

15. The apparatus of claim 11, wherein the set of modules executed in the processor unit is configured to provide at least one of ticket information, internet access, ordering, language translation, virtual reality, games, music, video, and a virtual flight attendant, entertainment, safety information, crew information, cockpit information, and interior architecture information.

16. The apparatus of claim 11, wherein the set of modules comprises at least one of an augmented realty module, a virtual flight attendant module, a virtual reality module, a language translator module, a user profile module, an entertainment module, a localization module, and an ordering module.

17. A computer implemented method for providing information to a user, the computer implemented method comprising:
receiving a request from an eyewear unit comprising a set of sensors, a video display, an audio device, a wireless communications unit, a processing unit, and a set of modules executing on the processing unit, wherein the eyewear unit is configured to receive user input from the set of sensors and configured to present the information to a user of the eyewear unit using at least one of the video display and the audio device;
identifying, by an aircraft data processing system, particular information responsive to the request to form identified information; and
sending, by a wireless system, the identified information to the eyewear unit.

18. The computer implemented method of claim 17 further comprising;
presenting the identified information on the eyewear unit in response to receiving the identified information at the eyewear unit.

19. The computer implemented method of claim 17, wherein the identified information comprises at least one of directions, a video, music, a game, ticket information, and a new module for execution by the eyewear unit.

* * * * *